(12) United States Patent
Koike et al.

(10) Patent No.: US 11,293,494 B2
(45) Date of Patent: Apr. 5, 2022

(54) BEARING

(71) Applicant: NTN CORPORATION, Osaka (JP)

(72) Inventors: Takashi Koike, Iwata (JP); Yasuyuki Fukushima, Iwata (JP); Yusuke Shibuya, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/971,291

(22) PCT Filed: Feb. 8, 2019

(86) PCT No.: PCT/JP2019/004632
§ 371 (c)(1),
(2) Date: Aug. 19, 2020

(87) PCT Pub. No.: WO2019/163566
PCT Pub. Date: Aug. 29, 2019

(65) Prior Publication Data
US 2020/0392987 A1 Dec. 17, 2020

(30) Foreign Application Priority Data

Feb. 23, 2018 (JP) .............................. JP2018-030698

(51) Int. Cl.
*F16C 41/00* (2006.01)
*F16C 19/06* (2006.01)
(Continued)

(52) U.S. Cl.
CPC .............. *F16C 41/00* (2013.01); *F16C 19/06* (2013.01); *F16C 19/527* (2013.01); *F16C 33/7853* (2013.01); *F16C 2233/00* (2013.01)

(58) Field of Classification Search
CPC .............. F16C 33/7853; F16C 33/7856; F16C 41/00; F16C 41/004; F16C 41/007; F16C 2233/00
See application file for complete search history.

(56) References Cited

U.S. PATENT DOCUMENTS

| 4,688,951 A * | 8/1987 | Guers | ..................... F16C 33/78 384/446 |
|---|---|---|---|
| 10,408,269 B2 * | 9/2019 | Okamura | ................ F16C 19/06 |

(Continued)

FOREIGN PATENT DOCUMENTS

| CN | 203968010 U | 11/2014 |
|---|---|---|
| JP | 2009-77614 A | 4/2009 |

(Continued)

OTHER PUBLICATIONS

International Search Report issued in corresponding International Patent Application No. PCT/JP2019/004632, dated May 7, 2019, with English translation.

*Primary Examiner* — James Pilkington
(74) *Attorney, Agent, or Firm* — McDermott Will & Emery LLP

(57) ABSTRACT

A bearing equipped with a sensor and incorporating a power generation function in a simple configuration is provided. A bearing includes an outer ring, a plurality of rolling elements, an inner ring, a cage, a seal member, a sensor, a transmission unit, and a power generation unit. The sensor is disposed in the seal member, and detects state information of the bearing. The transmission unit transmits the state information detected by the sensor to outside. The power generation unit is disposed so as to face a bearing space sandwiched between the outer ring and the inner ring, and generates electric power that is to be supplied to the sensor and the transmission unit. The power generation unit includes an element that converts stress into electromotive force.

14 Claims, 5 Drawing Sheets

(51) Int. Cl.
*F16C 19/52* (2006.01)
*F16C 33/78* (2006.01)

(56) References Cited

U.S. PATENT DOCUMENTS

2016/0084313 A1 3/2016 Oomoto
2019/0040912 A1 2/2019 Okamura et al.

FOREIGN PATENT DOCUMENTS

| JP | 2011-69402 A | 4/2011 |
| JP | 2013-124874 A | 8/2013 |
| JP | 2014-219078 A | 11/2014 |
| JP | 2018-84843 A | 5/2016 |
| JP | 2018-195474 A | 11/2016 |
| JP | 2017-187061 A | 10/2017 |
| WO | WO2017/171067 | * 10/2017 |

\* cited by examiner

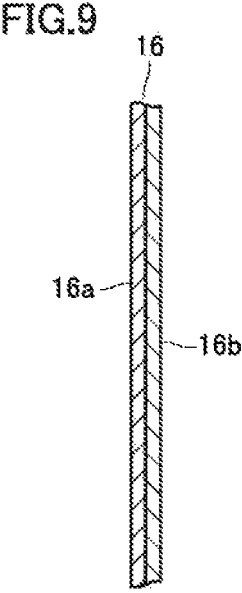
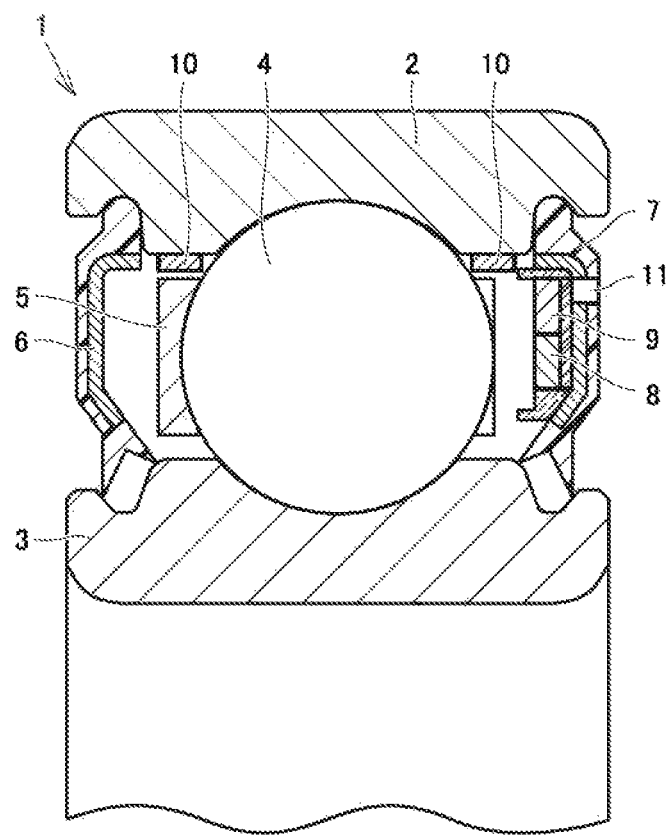

BEARING

CROSS REFERENCE TO RELATED APPLICATIONS

This patent application is the U.S. National Phase under 35 U.S.C. § 371 of International Application No. PCT/JP2019/004632, filed on Feb. 8, 2019, which claims the benefit of Japanese Patent Application No. 2018-030698, dated Feb. 23, 2018, the entire contents of each are hereby incorporated by reference in their entirety.

TECHNICAL FIELD

The present invention relates to a bearing, and more particularly to a bearing equipped with a sensor and incorporating a power generation function.

BACKGROUND ART

Conventionally, a bearing equipped with a sensor and incorporating a power generation function has been known (for example, see Japanese Patent Laying-Open No. 2017-187061). Japanese Patent Laying-Open No. 2017-187061 discloses a bearing equipped with a wireless sensor. The bearing equipped with a wireless sensor includes a cage having an annular body and provided with pockets, between which magnets are fixed one by one. The magnets are fixed such that their N poles and S poles are adjacent to each other in the circumferential direction of the annular body. Furthermore, a coil, a circuit unit, and an antenna are disposed on a surface of a first seal that faces the magnets. A sensor is disposed in one of an inner ring, an outer ring, and the first seal. In the above-mentioned bearing equipped with a wireless sensor, the output from the sensor is transmitted to outside with the help of a current generated in the coil through electromagnetic induction caused by the magnets.

CITATION LIST

Patent Literature

PTL 1: Japanese Patent Laying-Open No. 2017-187061

SUMMARY OF INVENTION

Technical Problem

The bearing disclosed in the above-mentioned Japanese Patent Laying-Open No. 2017-187061 has a complicated structure in which magnets are disposed in a cage and a coil is disposed on the first seal. Thus, the process of manufacturing this bearing may become complicated, and the manufacturing cost may increase.

The present invention has been made to solve the above-described problems. An object of the present invention is to provide a bearing equipped with a sensor and incorporating a power generation function in a simple configuration.

Solution to Problem

A bearing according to the present disclosure includes an outer ring, a plurality of rolling elements, an inner ring, a cage, a seal member, a sensor, a transmission unit, and a power generation unit. The outer ring has a raceway surface on an inner circumferential side of the outer ring. The rolling elements come into contact with the raceway surface of the outer ring. The inner ring comes into contact with the rolling elements. The cage holds the rolling elements. The seal member is provided between the outer ring and the inner ring. The sensor is disposed in the seal member and detects state information of the bearing. The transmission unit transmits the state information detected by the sensor to outside. The power generation unit is disposed to face a bearing space sandwiched between the outer ring and the inner ring, and generates electric power to be supplied to the sensor and the transmission unit. The power generation unit includes an element that converts stress into electromotive force.

Advantageous Effects of Invention

According to the above description, a bearing equipped with a sensor and incorporating a power generation function in a simple configuration is achieved.

BRIEF DESCRIPTION OF DRAWINGS

FIG. 9 is a schematic cross-sectional view for illustrating an element as a component of the bearing shown in FIG. 8.

FIG. 10 is an enlarged schematic cross-sectional view of a bearing according to the fifth embodiment of the present invention.

DESCRIPTION OF EMBODIMENTS

Figure 1:
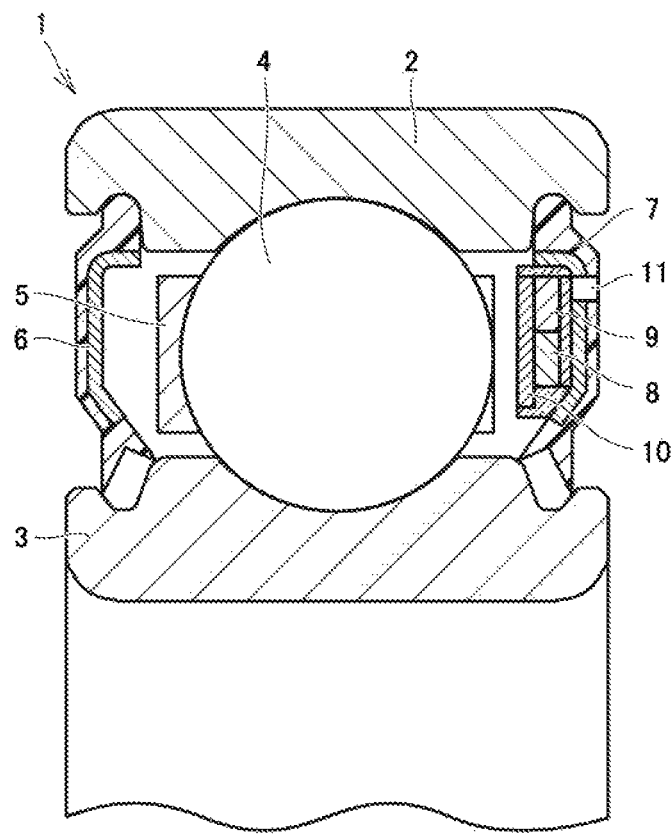
FIG. 1 is a partial schematic cross-sectional view of a bearing according to the first embodiment of the present invention.

The embodiments of the present invention will be hereinafter described with reference to the accompanying drawings, in which the same or corresponding components are designated by the same reference characters, and description thereof will not be repeated.

First Embodiment

<Configuration of Bearing>

Figure 2:
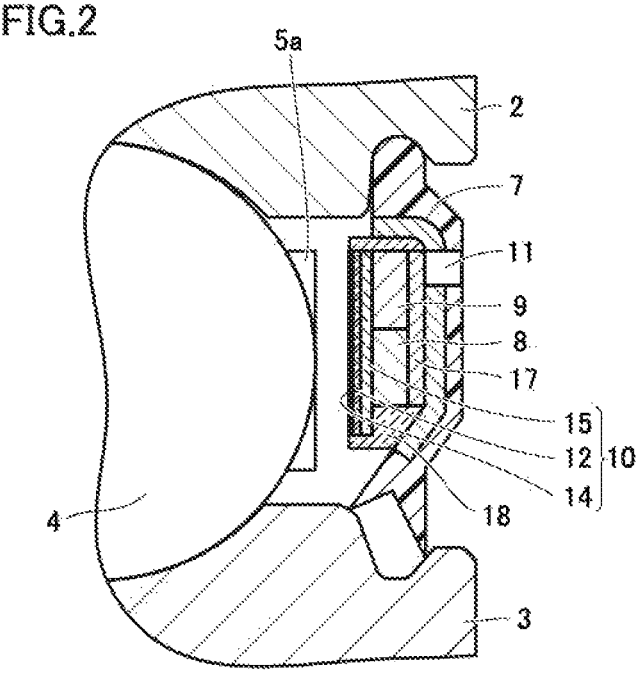
FIG. 2 is an enlarged schematic cross-sectional view of the bearing shown in FIG. 1.
Figure 3:
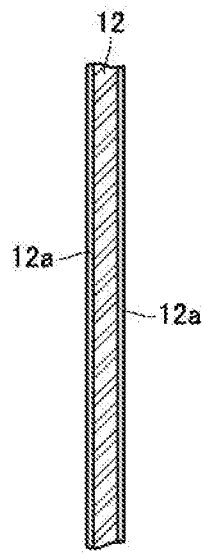
FIG. 3 is a schematic cross-sectional view for illustrating an element as a component of the bearing shown in FIG. 1.

FIG. 1 is a partial schematic cross-sectional view of a bearing according to the first embodiment of the present invention. FIG. 2 is an enlarged schematic cross-sectional view of the bearing shown in FIG. 1. FIG. 3 is a schematic cross-sectional view for illustrating an element as a component of the bearing shown in FIG. 1.

A bearing 1 shown in each of FIGS. 1 to 3 is a bearing equipped with a sensor and mainly includes an outer ring 2, a plurality of rolling elements 4, an inner ring 3, a cage 5, seal members 6 and 7, a sensor 8, a transmission unit 9, a power generation unit 10, and an antenna 11. The following is an explanation about the case as an example where a deep groove ball bearing including rolling element 4 as a ball is used as bearing 1. Also in the following explanation, bearing 1 is assumed to be an inner ring rotating type including inner ring 3 as a rotating ring and outer ring 2 as a fixed ring.

Outer ring 2 has a raceway surface on its inner circumferential side. The plurality of rolling elements 4 come into contact with the raceway surface of outer ring 2. Inner ring 3 comes into contact with the plurality of rolling elements 4. Cage 5 holds the plurality of rolling elements 4. Seal members 6 and 7 include a first seal member 6 and a second seal member 7. Seal members 6 and 7 are provided between outer ring 2 and inner ring 3. Seal members 6 and 7 are surrounded by outer ring 2 and inner ring 3, and seal a bearing space in which the plurality of rolling elements 4 are located. A lubricant such as grease is enclosed within the bearing space. Seal members 6 and 7 are not necessarily configured to come into contact with each of outer ring 2 and inner ring 3 as shown in FIG. 1, but may have any other configurations. For example, seal members 6 and 7 may be configured to be connected to outer ring 2 as a fixed ring and to provide a gap between inner ring 3 as a rotating ring and each of seal members 6 and 7. Non-contact type seal members can be used as seal members 6 and 7, for example. Sensor 8 is disposed in seal member 7 and detects the state information of bearing 1. The type of sensor 8 is not limited to one type, but a plurality of types of sensors 8 may be disposed in seal member 7. Transmission unit 9 transmits the state information detected by sensor 8 to outside. Power generation unit 10 is a power supply capable of self-power generation, disposed so as to face the bearing space, and generates electric power that is to be supplied to sensor 8 and transmission unit 9. Power generation unit 10 includes an element 12 that converts 20 stress into electromotive force.

In other words, in the above-described bearing 1, seal member 7 is provided integrally with: one or more types of sensors 8; transmission unit 9 that transmits the state information of the bearing detected by sensor 8 to outside; and power generation unit 10 capable of self-power generation. Sensor 8 is a temperature sensor or a vibration sensor, for example, A plurality of sensors may be mounted as sensor 8. Sensor 8 and transmission unit 9 are mounted, for example, on a substrate 17.

Transmission unit 9 is a wireless transmitter that transmits the state information of the bearing detected by sensor 8 to outside. Transmission unit 9 wirelessly transmits the state information of bearing 1 to an external information processing apparatus (not shown) located away from the portion where bearing 1 is disposed. Antenna 11 is connected to transmission unit 9. Transmission unit 9 transmits the state information through antenna 11 to outside.

Sensor 8 and transmission unit 9 that are mounted on substrate 17 are disposed inside a housing 18 together with substrate 17. Housing 18 is connected to the inner circumferential surface of seal member 7. In other words, power generation unit 10 including: substrate 17 having sensor 8 and transmission unit 9 mounted thereon; and element 12 is incorporated in housing 18, and fixed to the side surface of seal member 7.

Seal member 7 is provided with a through hole passing through seal member 7 from its inner circumferential surface to its outer circumferential surface. Antenna 11 is disposed inside the through hole. Antenna 11 is connected to transmission unit 9. Power generation unit 10 is disposed on the sides of sensor 8 and transmission unit 9 that face cage 5. Power generation unit 10 is connected to seal member 7. Power generation unit 10 mainly includes element 12, a protection film 14, and an elastic member 15.

As element 12 included in power generation unit 10, for example, a piezoelectric film is used. FIG. 3 shows a structure as an example of the piezoelectric film corresponding to element 12. Examples of the piezoelectric film that forms element 12 may be a piezoelectric polymer film (a piezo film) made of polyvinylidene fluoride (PVDF) and the like having a piezoelectric function. Element 12 may have a structure as an electrode formed as a result of vapor deposition of an aluminum electrode 12a on each of both surfaces of the piezoelectric film.

Element 12 is disposed in seal member 7 on the side facing cage 5. In order to protect element 12 from adhesion of grease, protection film 14 may be provide on the first surface of element 12 that faces cage 5. Furthermore, elastic member 15 may be disposed on the second surface of element 12 opposite to the first surface. By placing such elastic member 15, element 12 as a piezoelectric film is deformable inside seal member 7. For example, element 12 as a piezoelectric film (piezo film) formed in a ring shape is disposed on seal member 7 so as to be deformable with the pressure applied in the axial direction.

When the rotating ring (for example, inner ring 3) of bearing 1 is rotated, cage 5 is also rotated to stir a lubricant such as grease inside bearing 1. When grease moves inside bearing 1, element 12 including a piezoelectric film is deformed to thereby generate electromotive force in element 12. The electric power generated in element 12 is processed as a power supply. For example, the current generated in element 12 is subjected to full-wave rectification and supplied to a capacitor and the like for charging. The electric power obtained in this way is used as electric power for sensor 8 and transmission unit 9 for wireless transmission that are incorporated in seal member 7.

Figure 4:
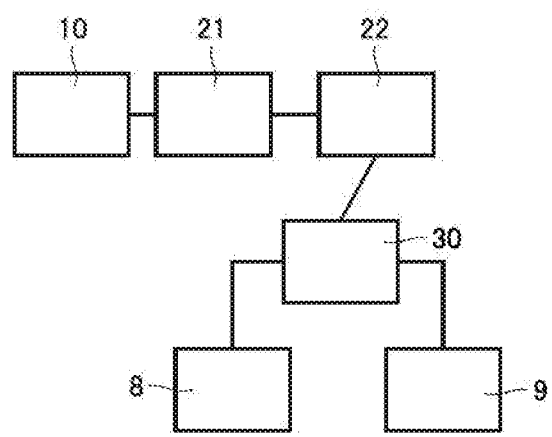
FIG. 4 is a block diagram for illustrating the configuration of a modification of the bearing shown in FIG. 1.

In addition, the electric power generated in element 12 may be stored in a power storage element such as a secondary battery and an electric double layer capacitor so as to be used. FIG. 4 is a block diagram for illustrating the configuration of a modification of the bearing shown in FIG. 1. FIG. 4 shows the relation of the configuration related to control of sensor 8, transmission unit 9 and power generation unit 10 in the bearing. The bearing shown in FIG. 4 has basically the same configuration as that of bearing 1 shown in FIGS. 1 to 3, but is different from bearing 1 shown in FIGS. 1 to 3 in that it includes a rectification unit 21, a power storage unit 22, and a control unit 30. As shown in FIG. 4, power generation unit 10 is connected to power storage unit 22 through rectification unit 21. Rectification unit 21 rectifies the current generated in power generation unit 10. Power storage unit 22 is charged with the current rectified in rectification unit 21. Control unit 30 is connected to power storage unit 22, sensor 8, and transmission unit 9. Control unit 30 controls the supply of electric power from power storage unit 22 to sensor 8 and transmission unit 9. Rectification unit 21, power storage unit 22, and control unit 30 can be disposed at any positions inside the bearing. For example, rectification unit 21, power storage unit 22, and control unit 30 may be mounted on substrate 17. By the configuration as described above, the electric power supplied to sensor 8 and transmission unit 9 can be stabilized, and also, the operating time of sensor 8 and transmission unit 9 is limited, so that devices such as a sensor and a transmitter consuming considerable electric power can be used.

<Functions and Effects>

Bearing 1 according to the present disclosure includes outer ring 2, a plurality of rolling elements 4, inner ring 3, cage 5, seal members 6 and 7, sensor 8, transmission unit 9, and power generation unit 10. Sensor 8 is disposed in seal member 7 and detects the state information of bearing 1. Transmission unit 9 transmits the state information detected by sensor 8 to outside. Power generation unit 10 is disposed to face the bearing space sandwiched between outer ring 2 and inner ring 3, and generates electric power that is to be supplied to sensor 8 and transmission unit 9. Power generation unit 10 includes element 12 that converts stress into electromotive force.

In this case, during use of bearing 1, cage 5 rotates with respect to seal members 6 and 7 to thereby stir the lubricant such as grease placed in the bearing space. At this time, stirring of the lubricant applies stress to element 12 of power generation unit 10. Element 12 converts the stress into electromotive force to generate electricity. By supplying this electricity to sensor 8 and transmission unit 9, the state information such as a temperature of bearing 1 can be measured by sensor 8 and transmitted by transmission unit 9 to outside. In contrast to a power generation system using a plurality of components such as a system generating electric power by electromagnetic induction caused using a magnet and a coil in power generation unit 10, the above-described bearing 1 can directly obtain electric power by exerting stress on element 12. Thus, the structure of bearing 1 can be simplified as compared with the case where the power generation system using electromagnetic induction as described above is adopted.

Furthermore, unlike the conventional case, each pillar portion located between pockets of a cage does not need to have a through hole through which a magnet is inserted. Thus, the strength of the cage can be prevented from decreasing due to existence of such a through hole. Furthermore, in the case where a magnet is disposed inside a bearing, the magnetic force by this magnet may influence the bearing performance. However, such an influence exerted on the bearing performance by the magnetic force can be avoided in bearing 1 according to the present embodiment. In addition, in the case where a magnet is disposed inside a bearing, the magnetic force of this magnet causes accumulation of iron powder and the like inside the bearing, which may lead to breakage and a lifetime reduction of the bearing. However, bearing 1 according to the present embodiment can avoid such breakage and a lifetime reduction.

Furthermore, the bearing is designed such that the number and size of rolling elements are increased to the maximum extent possible, so as to allow miniaturization of the bearing while satisfying the required performance such as a load condition, a lifetime condition and the like for the bearing. However, in the case where a magnet is disposed between pockets of a cage as in the conventional manner, formation of a bearing having a prescribed size requires measures to be taken, for example, by reducing the number of rolling elements or reducing the size of each rolling element in order to ensure the position where the magnet is disposed. Thus, in order to obtain a bearing that satisfies the same required performance, the bearing needs to be increased in size in the case where a magnet is disposed in a cage as in the conventional manner. The bearing increased in size in this way causes a problem that the manufacturing cost of the bearing is increased or the design flexibility of a mechanical apparatus to which this bearing is applied is decreased. On the other hand, the bearing according to the present embodiment as described above includes small-sized power generation unit 10. This eliminate the need to increase the size of the bearing for positioning power generation unit 10 therein, with the result that the above-mentioned problems can be avoided.

In the above-described bearing 1, element 12 is a piezoelectric film. In this case, one sheet-shaped member that is a piezoelectric film is used as element 12 that generates electromotive force. Thus, the configuration of bearing 1 can be reliably simplified as compared with the case where electric power is generated using a plurality of members such as a magnet and a coil as in the conventional manner.

In the above-described bearing 1, element 12 is disposed on the inner circumferential surface of seal member 7 that faces the bearing space. In this case, the stress caused by the flow of the lubricant such as grease inside the bearing space can be directly exerted on element 12. This allows efficient power generation in element 12 during use of bearing 1.

Bearing 1 includes power storage unit 22. Power storage unit 22 is connected to power generation unit 10, sensor 8, and transmission unit 9, and configured to temporarily store electric power generated by power generation unit 10 and supply the electric power to sensor 8 and transmission unit 9. In this case, the electric power generated in power generation unit 10 can be temporarily accumulated in power storage unit 22 and supplied from this power storage unit 22 to sensor 8 and transmission unit 9, as required. As a result, electric power can be stably supplied to sensor 8 and transmission unit 9, and the operations of these units can be stabilized.

From a different point of view, in the above-described bearing 1, a film-like element that is element 12 as a component of power generation unit 10 is disposed on the inner diameter surfaces of seal members 6, 7 and outer ring 2 that do not rotate in bearing 1 (see FIG. 10), on the outer diameter surface of inner ring 3, or the like. A film-like element used in this case may be a piezoelectric film that deforms to generate electromotive force, or an electrically-charged film that generates electromotive force by friction. By using such film-like element 12 in power generation unit 10, this element 12 can be deformed by the stress caused by the lubricant stirred by rotation of the bearing, thereby allowing power generation. Thus, power generation unit 10 can be reduced in size. Furthermore, the structure of power generation unit 10 can be simplified as compared with, for example, the power generation unit that generates electric power using electromagnetic induction. As a result, power generation unit 10 can be disposed in a narrow space inside bearing 1. Element 12 may be any element other than the piezoelectric film or the electrically-charged film mentioned above as long as it converts stress into electromotive force. Also, element 12 may have an annular shape extending along the side surface of seal member 7, but may have other shapes. For example, a plurality of elements 12 may be disposed to be spaced apart from each other along the side surface of seal member 7 in a view seen in the direction of the rotation axis of bearing 1. In this case, the planar shape of element 12 in a view seen in the above-mentioned direction of the rotation axis may be any shape such as a rectangular shape, a sector shape, a circular shape, and the like.

Specific examples of a film-like element may be a piezoelectric polymer film as a film having a piezoelectric function, for example. Specifically, a film-like element can be a piezoelectric polymer film (a piezo film) made of a polyvinylidene fluoride (PVDF) resin and the like formed of a film-shaped polymer ferroelectric material. A piezoelectric polymer film (also referred to as a piezoelectric film) is deformed to generate a large amount of electric power as compared with an inorganic material.

As an arrangement example of element 12, element 12 is disposed in a ring shape on the side surface of seal member 7. The piezoelectric film as element 12 is disposed in a deformable state. Furthermore, an aluminum film is vapor-deposited on both surfaces of the piezoelectric film, and the resultant aluminum film is used as an electrode. It is preferable to use a piezoelectric film that generates electromotive force even with a minutely small displacement (for example, a displacement of about several μm).

In bearing 1 having the configuration as described above, rotation of the rotating ring (for example, inner ring 3) also causes rotation of cage 5, thereby stirring the lubricant inside bearing 1. The lubricant moves to deform the piezoelectric film as element 12, to thereby generate electromotive force. The electric power obtained in this way can be used as circuit power for sensor 8 and transmission unit 9 as a radio transmitter that are incorporated in seal member 7. In this case, elastic member 15 may be disposed between element 12 and seal member 7 so as to increase the amount of deformation. Also, protection film 14 may be mounted so as to prevent element 12 from coming into direct contact with the lubricant such as grease.

Furthermore, the above-described bearing 1 has a structure in which element 12 such as a piezoelectric film that is a sheet generating electromotive force is fixed to seal member 7. Thus, power generation unit 10 can be disposed inside bearing 1 without significantly changing the internal features of bearing 1 from a conventional standard bearing. As a result, a bearing equipped with a sensor can be configured to have the same size as a standard bearing and wirelessly transmit a sensor signal during self-power generation.

Second Embodiment

<Configuration of Bearing>

Figure 5:
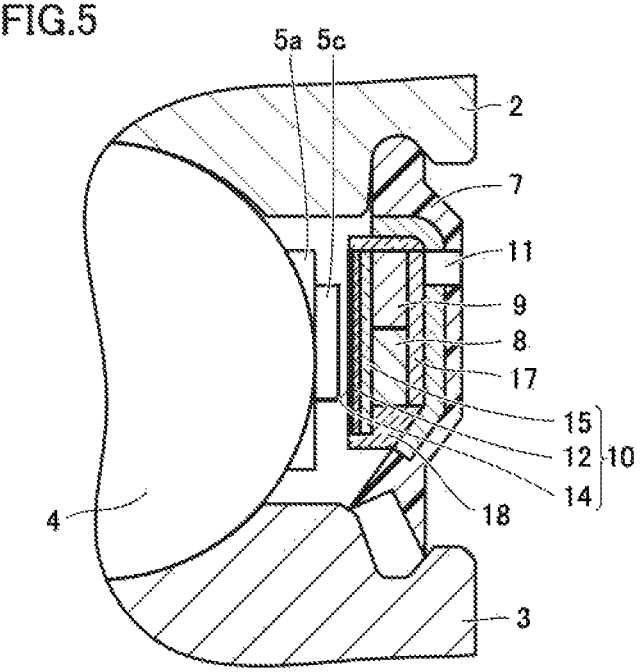
FIG. 5 is an enlarged schematic cross-sectional view of a bearing according to the second embodiment of the present invention.
Figure 6:
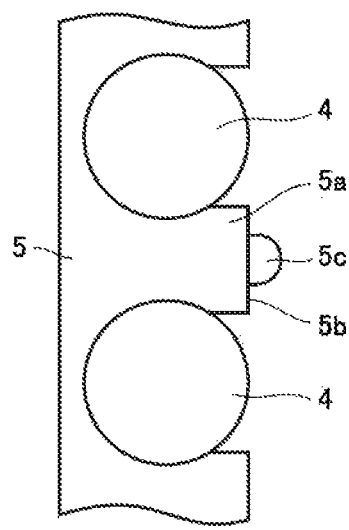
FIG. 6 is a schematic view for illustrating a cage of the bearing shown in FIG. 5.

FIG. 5 is an enlarged schematic cross-sectional view of a bearing according to the second embodiment of the present invention. FIG. 6 is a schematic view for illustrating a cage of the bearing shown in FIG. 5. The bearing shown in FIGS. 5 and 6 has basically the same configuration as that of bearing 1 shown in FIGS. 1 to 3, but is different in configuration of cage 5 from bearing 1 shown in FIGS. 1 to 3. In other words, cage 5 of the bearing shown in FIGS. 5 and 6 is provided with a protrusion 5e on an end surface 5b that faces power generation unit 10. Specifically, cage 5 is provided with a plurality of pockets in which rolling elements 4 are respectively held. Also, each region between the plurality of pockets corresponds to a pillar portion 5a. Protrusion 5c is formed on end surface 5b of pillar portion 5a that faces power generation unit 10.

The cross section of protrusion 5c taken along the radial direction of inner ring 3 may have any shape, which may be a rectangular shape, for example, as shown in FIG. 5. Furthermore, the cross section of protrusion 5c taken along the direction perpendicular to the radial direction of inner ring 3 may also have any shape, which may be a semicircular shape, for example, as shown in FIG. 6. Furthermore, the number of protrusionsS formed on cage 5 may be one but may be two or more.

Also, as shown in FIG. 5, elastic member 15 is disposed on element 12 on the seal member 7 side. In place of this elastic member 15, a gap may be provided between element 12 and each of sensor g and transmission unit 9.

<Functions and Effects>

In the above-described bearing 1, cage 5 includes protrusion 5c formed on the surface of cage 5 that faces element 12 disposed in seal member 7. In this case, when cage 5 moves relative to element 12 during use of bearing 1, the distance between cage 5 and the surface of element 12 can be locally reduced by existence of protrusion 5c. As a result, the stress applied to element 12 by the lubricant inside the bearing space during use of bearing 1 can be increased as compared with the case where no protrusion 5c is provided. From a different point of view, it becomes possible to increase the amount of deformation of element 12, which occurs when the lubricant such as grease is stirred inside the bearing space by rotation of cage 5 caused by rotation of inner ring 3. Furthermore, since protrusion 5c presses different positions of element 12, a continuous pulse voltage can be stably generated in element 12. Accordingly, power generation in element 12 can be increased in amount and also stabilized.

Furthermore, elastic member 15 or a gap may be provided on the seal member 7 side of element 12 so as to increase the amount of deformation of element 12. Also in this case, the amount of power generation in element 12 can be increased.

Third Embodiment

<Configuration of Bearing>

Figure 7:
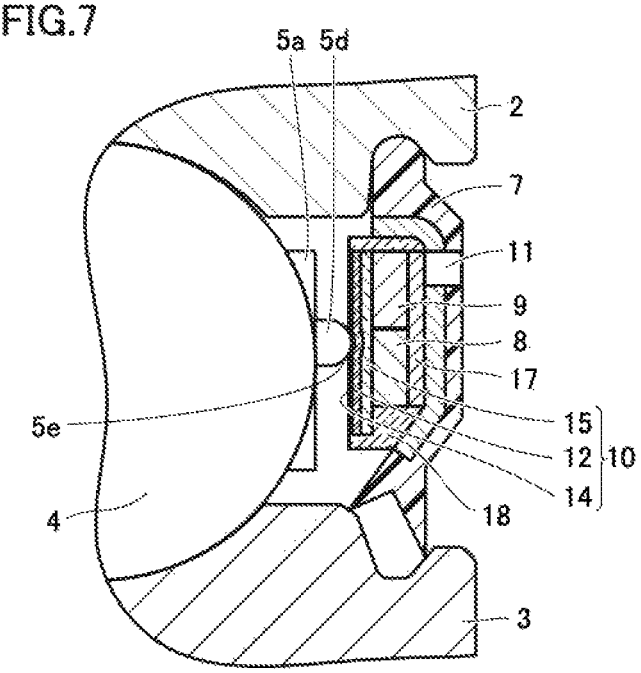
FIG. 7 is an enlarged schematic cross-sectional view of a bearing according to the third embodiment of the present invention.

FIG. 7 is an enlarged schematic cross-sectional view of a bearing according to the third embodiment of the present invention. The bearing shown in FIG. 7 has basically the same configuration as that of the bearing shown in FIGS. 5 and 6, but is different in configuration of cage 5 from the bearing shown in FIGS. 5 and 6. Specifically, cage 5 of the bearing shown in FIG. 7 is provided with a protrusion 5d on the surface of pillar portion 5a that faces power generation unit 10. Protrusion 5d is sized enough to come into direct contact with power generation unit 10. Specifically, the height of protrusion 5d from the surface of pillar portion 5a is greater than the distance from the surface of pillar portion 5a to power generation unit 10. The bearing shown in FIG. 7 may have a configuration different from the configuration in which a lubricant such as grease is enclosed inside the bearing. For example, power generation unit 10 and protrusion 5d shown in FIG. 7 may be applied to a bearing that is lubricated with lubricating oil without having grease enclosed therein.

Protrusion 5d can have any shape, but may have a cylindrical shape, for example, as shown in FIG. 7. Also, a tip end surface 5e of protrusion 5d may have any shape, but preferably has a curved surface shape. For example, tip end surface 5e may have a spherical surface. Furthermore, the number of protrsions 5d formed on cage 5 may be one, but may be two or more.

<Functions and Effects>

In the above-described bearing 1, protrusion 5d is configured to press element 12 during use of bearing 1. In this case, since protrusion 5d directly presses element 12 during use of bearing 1, stress can be reliably exerted on element 12. Thus, in element 12, power generation can be increased in amount and also stabilized. More specifically, since element 12 can be continuously pressed by protrusion 5d during use of bearing 1, a continuous pulse voltage can be generated in element 12.

Fourth Embodiment

<Configuration of Bearing>

Figure 8:
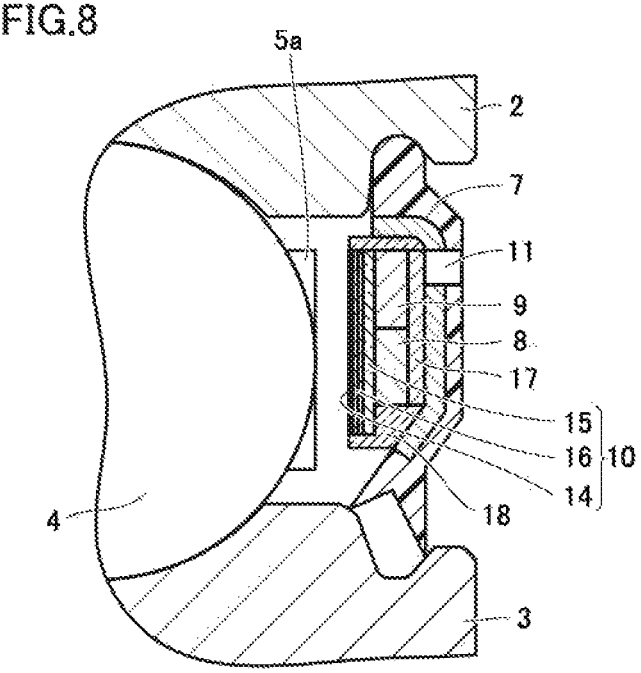
FIG. 8 is an enlarged schematic cross-sectional view of a bearing according to the fourth embodiment of the present invention.

FIG. 8 is an enlarged schematic cross-sectional view of a bearing according to the fourth embodiment of the present invention. FIG. 9 is a schematic cross-sectional view for illustrating an element as a component of the bearing shown in FIG. 8. The bearing shown in FIGS. 8 and 9 has basically the same configuration as that of bearing 1 shown in FIGS. 1 to 3, but is different from bearing 1 shown in FIGS. 1 to 3 in that an element 16 as a component of power generation unit 10 is not a piezoelectric film but is an electrically-charged film that generates electromotive force by friction.

FIG. 9 shows a structure example of an electrically-charged film as element 16. Element 16 as an electrically-charged film has a structure formed by stacking two material films 16a and 16b that are made of different materials. In other words, the electrically-charged film that forms element 16 generates electromotive force with the help of triboelectrification and has a structure formed of two different materials in contact with each other. These two different materials are configured such that the area of contact therebetween and the proximity distance therebetween am changed in accordance with the stress to be applied. As a combination of two different materials, it is preferable to combine the materials that are apart from each other on the triboelectric series. For example, one of the materials may be tetrafluoroethylene-hexafluoropropylene copolymer (FEP) while the other of the materials may be polyurethane (PU). By applying pressure to the electrically-charged film or by deforming the electrically-charged film, a potential difference occurs by triboelectrification between these two materials. Thus, by using the above-mentioned electrically-charged film as element 16, element 16 (an electrically-charged film) is deformed by stirring of the lubricant inside the bearing space, to thereby change the area of contact and the proximity distance between two material films 16a and 16b that form element 16, with the result that a potential difference occurs by triboelectrification. Then, the current resulting from this potential difference is drawn out from element 16 by the electrode and the like provided in each of material films 16a and 16b, thereby allowing power generation unit 10 to generate electric power.

<Functions and Effects>

In the above-described bearing 1, element 16 is an electrically-charged film. In this case, power generation unit 10 can be implemented to have a simple configuration as in the case where a piezoelectric film is used as element 12.

Fifth Embodiment

<Configuration of Bearing>

FIG. 10 is an enlarged schematic cross-sectional view of a bearing according to the fifth embodiment of the present invention. Bearing 1 shown in FIG. 10 has basically the same configuration as that of bearing 1 shown in FIGS. 1 to 3, but is different in positioning of power generation unit 10 from bearing 1 shown in FIGS. 1 to 3. Specifically, in bearing 1 shown in FIG. 10, power generation unit 10 is disposed on the inner diameter surface of outer ring 2. In FIG. 10, two power generation units 10 are disposed on the inner diameter surface of outer ring 2 so as to sandwich the raceway surface of outer ring 2 therebetween in the central axis direction. From a different point of view, each power generation unit 10 is disposed on the inner diameter surface of outer ring 2 so as to face the outer circumferential surface of cage 5. Power generation unit 10 may include element 12 shown in FIGS. 1 to 2, or may include element 16 shown in FIGS. 8 and 9. Also, power generation unit 10 may be disposed on the inner diameter surface of outer ring 2 only on one side in a view seen from the raceway surface. For example, power generation unit 10 may be disposed only in a region on the inner diameter surface of outer ring 2 on the side close to seal member 7 with respect to the raceway surface.

The above-mentioned configuration is assumed to be applied to the case where inner ring 3 rotates. In the case where outer ring 2 rotates, power generation unit 10 may be disposed on the outer diameter surface of inner ring 3. Furthermore, power generation unit 10 may be disposed on the side surface of seal member 6 that faces cage 5. Sensor 8 and transmission unit 9 may be disposed in seal member 6. Power generation unit 10 may be disposed in each of two seal members 6 and 7.

<Functions and Effects>

In the above-described bearing, elements 12 and 16 each are disposed on a surface of one of outer ring 2 and inner ring 3 that is not connected to a rotating member, in which the surface is located to face the bearing space. Also in this case, the same effects as those achieved by bearing 1 shown in FIGS. 1, 8 and the like can be achieved.

The above embodiment have been described by way of example with regard to a bearing within which a lubricant such as grease is enclosed, but the configuration according to each of the embodiments is applicable to any type of bearing. For example, the configuration according to each of the embodiments described above may be applied even to a bearing configured to receive supply of lubricating oil from outside as long as this lubricating oil applies stress to elements 12 and 16 in power generation unit 10 during use of the bearing.

Although the embodiments of the present invention have been described as above, the above-described embodiments may also be variously modified. The scope of the present invention is not limited to the above-described embodiments. The scope of the present invention is defined by the terms of the claims, and is intended to include any modifications within the meaning and scope equivalent to the terms of the claims.

REFERENCE SIGNS LIST 1 bearing, 2 outer ring, 3 inner ring, 4 rolling element, 5 cage, 5a pillar portion, 5b end surface, 5c, 5d protrusion, 5e tip end surface, 6, 7 seal member, 8 sensor, 9 transmission unit, 10 power generation unit, 11 antenna, 12, 16 element, 12a aluminum electrode, 14 protection film, 15 elastic member, 16a, 16b material film, 17 substrate, 18 housing, 21 rectification unit, 22 power storage unit, 30 control unit.

The invention claimed is:

1. A bearing comprising:
   an outer ring having a raceway surface on an inner circumferential side of the outer ring;
   a plurality of rolling elements that come into contact with the raceway surface of the outer ring;
   an inner ring that comes into contact with the rolling elements;
   a cage that holds the rolling elements;
   a seal member provided between the outer ring and the inner ring;
   a sensor that detects state information of the bearing, the sensor being disposed in the seal member;
   a transmission unit that transmits the state information detected by the sensor to outside;

a power generation unit that generates electric power to be supplied to the sensor and the transmission unit, the power generation unit being disposed to face a bearing space sandwiched between the outer ring and the inner ring; and wherein a lubricant is filled in the bearing space, wherein when one of the outer ring and the inner ring rotates, the cage rotates to stir the lubricant, wherein the power generation unit includes an element that converts stress applied from the lubricant into electromotive force, and wherein no magnet is included in the bearing to generate the stress applied to the element.

2. The bearing according to claim 1, wherein the element is a piezoelectric film.

3. The bearing according to claim 2, wherein the element is disposed on an inner circumferential surface of the seal member that faces the bearing space.

4. The bearing according to claim 2, wherein the element is disposed on a surface of one of the outer ring and the inner ring that is not connected to a rotating member, the surface being located to face the bearing space.

5. The bearing according to claim 2, further comprising a power storage unit connected to the power generation unit, the sensor and the transmission unit, wherein the power storage unit temporarily stores the electric power generated by the power generation unit, and supplies the electric power to the sensor and the transmission unit.

6. The bearing according to claim 1, wherein the element is an electrically-charged film.

7. The bearing according to claim 6, wherein the element is disposed on an inner circumferential surface of the seal member that faces the bearing space.

8. The bearing according to claim 6, wherein the element is disposed on a surface of one of the outer ring and the inner ring that is not connected to a rotating member, the surface being located to face the bearing space.

9. The bearing according to claim 6, further comprising a power storage unit connected to the power generation unit, the sensor and the transmission unit, wherein the power storage unit temporarily stores the electric power generated by the power generation unit, and supplies the electric power to the sensor and the transmission unit.

10. The bearing according to claim 1, wherein the element is disposed on an inner circumferential surface of the seal member that faces the bearing space.

11. The bearing according to claim 10, wherein the cage includes a protrusion formed on a surface of the cage that faces the element disposed in the seal member.

12. The bearing according to claim 11, wherein the protrusion presses the element.

13. The bearing according to claim 1, wherein the element is disposed on a surface of one of the outer ring and the inner ring that is not connected to a rotating member, the surface being located to face the bearing space.

14. The bearing according to claim 1, further comprising a power storage unit connected to the power generation unit, the sensor and the transmission unit, wherein the power storage unit temporarily stores the electric power generated by the power generation unit, and supplies the electric power to the sensor and the transmission unit.

* * * * *